No. 621,011. Patented Mar. 14, 1899.
J. A. WRIGHT.
CLUTCH.
(Application filed Jan. 29, 1898.)
(No Model.)
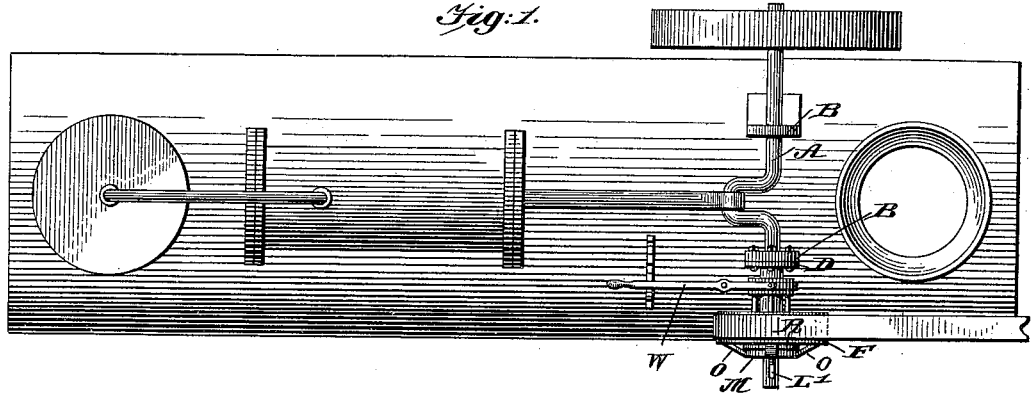
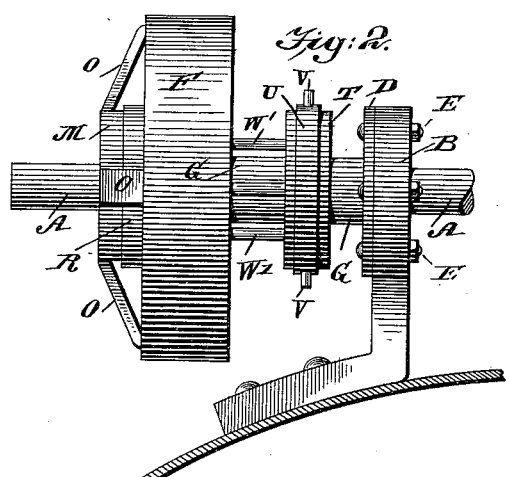 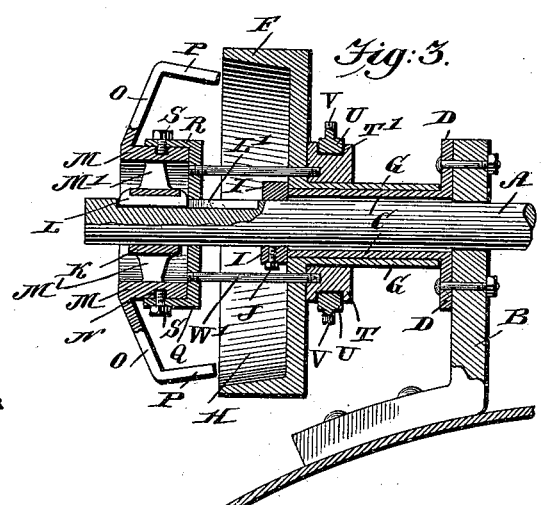
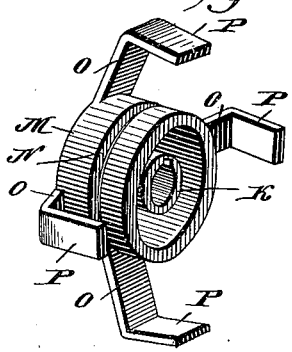 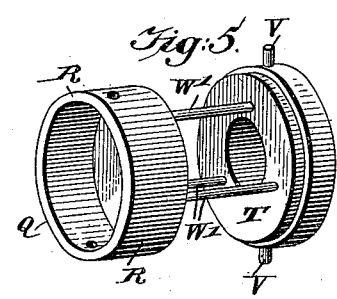 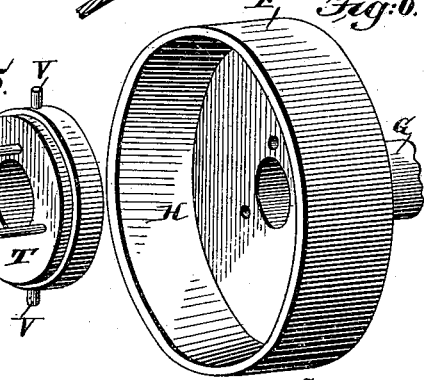
Witnesses
H. G. Dieterich
Chas. E. Brock
Inventor
James A. Wright
by O'Meara & Co.
Attorneys

UNITED STATES PATENT OFFICE.

JAMES A. WRIGHT, OF MANVEL, NORTH DAKOTA.

CLUTCH.

SPECIFICATION forming part of Letters Patent No. 621,011, dated March 14, 1899.

Application filed January 29, 1898. Serial No. 668,507. (No model.)

*To all whom it may concern:*

Be it known that I, JAMES A. WRIGHT, residing at Manvel, in the county of Grand Forks and State of North Dakota, have invented a new and useful Clutch, of which the following is a specification.

This invention relates generally to clutches and particularly to frictional clutches.

The object of the invention is to provide a simple and effective clutch mechanism which may be used in connection with belt-wheels, so that the latter may be instantly locked to the shaft to be rotated thereby or released therefrom when it is not desired to operate the machinery driven by the belt without the necessity of stopping the motive power or of shifting the belt by hand while the motive power is in operation, which occasions inconvenience and delay.

With the above objects in view the invention consists of a belt-wheel mounted independently of the driving-shaft, a collar locked from rotation upon the shaft, but slidable thereon and carrying friction-arms which are adapted to engage the belt-wheel, so as to cause the latter to rotate with the shaft, and a shifting-lever for moving the friction-arms in and out of engagement with the belt-wheel.

The invention consists also in certain details of construction and novelties of combination, all of which will be fully described hereinafter, and pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a top plan view of an engine, showing the practical application of my invention. Fig. 2 is an elevation showing the belt-wheel locked to the shaft by the frictional clutch, the shifting-lever being omitted. Fig. 3 is a vertical sectional view showing the clutch disengaged from the belt-wheel. Fig. 4 is a perspective view of a collar carrying friction-arms. Fig. 5 is a similar view of the mechanism for shifting the clutch. Fig. 6 is a perspective view of the belt-wheel.

Referring to the accompanying drawings, A indicates the shaft, and B one of the bearings therefor.

C is a sleeve through which the shaft extends and is rotatable, said sleeve provided on its outer end with an annular flange D, by means of which it is secured to the bearing B, the securing-bolts E passing therethrough.

The belt-wheel F is provided with a sleeve G, which extends from the outer face thereof and is rotatable about the sleeve C, said belt-wheel having an annular cavity H formed in its inner face, the walls of which are inclined, as illustrated. This wheel is held in place by the collar I, secured by set-screw J to the shaft.

The clutch consists of the hub K, having a key L, which moves in a keyway L', formed in the shaft. The rim M is provided for the hub and connected therewith by the spokes M', said rim provided intermediate its ends with an annular groove N. Formed about the periphery of this rim, at the inner face thereof, are the radial arms O, having their ends bent to form the frictional contacts P, which are inclined to correspond with the inclined walls of the annular cavity formed in the belt-wheel, with which they are adapted to engage.

Q is a collar having a flange R, which is adapted to fit over the rim of the clutch and having the inwardly-projecting screws or pins S, which engage and move in the annular groove N of the rim.

T is a collar slidable upon the sleeve G of the belt-wheel and provided with the annular groove T', in which the ring U is adapted to move, said ring having pins V projecting therefrom on opposite sides of its center, which are engaged by the arms of the bifurcated shifting-lever W.

Rods W', screw-threaded at their ends, extend through perforations in the belt-wheel and are connected at their respective ends to collars Q and T.

When the bearings are in the position illustrated in Fig. 3, the belt-wheel and the collars Q and T are at rest, while the clutch is revolving with the shaft. When it is desired to rotate the belt-wheel, the shifting-lever is operated, which, through the medium of the collars U and T and the connecting-rods, moves the friction-arms into engagement with the belt-wheel, which locks said wheel to the shaft and effects the rotation thereof.

From the above description it will be seen that I have produced a very simple construction of clutch mechanism, by means of which the belt-wheel may be locked to the shaft when it is desired to rotate the same and released therefrom when the machinery driven by the belt is not to be operated, said result being accomplished without stopping the engine and without shifting the belt by hand, which causes inconvenience and delay.

Having thus fully described my invention, what I claim as new, and desire to secure by Letters Patent of the United States, is—

1. The combination with a shaft, of a wheel loose thereon, a collar positioned on each side of said wheel, rods connecting said collars and movable through perforations formed in the wheel, a hub slidable upon the shaft and keyed thereon and carrying a plurality of friction-arms for engaging the wheel, said hub being so connected with one of the first-named collars as to move longitudinally thereby but rotate independently thereof, and means for effecting the movement of said collars, substantially as set forth.

2. The combination with a shaft, of a wheel loose thereon, a collar positioned on each side of said wheel, rods connecting said collars and movable through perforations in the wheel, one of said collars formed with an annular groove, a ring movable in said groove, an operating-lever engaging said ring, a hub keyed upon the shaft but slidable thereon, said hub being so connected with the collar upon the opposite side of the wheel as to move longitudinally thereby but rotate independently thereof, and carrying a plurality of friction-arms adapted to engage the wheel, substantially as set forth.

3. The combination with a shaft, of a wheel loose thereon, a collar positioned on each side of said wheel, rods connecting the said collars and movable through the wheel, one of said collars formed with a flange carrying inwardly-projecting pins or studs, a collar keyed upon the shaft but slidable thereon and having an annular groove formed therein to receive pins of one of the first-named collars, and carrying friction-arms adapted to engage the wheel, and means for effecting the movement of said collars, substantially as set forth.

4. The combination with a shaft, of a sleeve supported independently thereof, through which the shaft extends, a wheel formed with a sleeve extending outwardly from one of its faces and rotatable upon the stationary sleeve, a collar for holding the wheel upon the sleeve, said wheel having a flange formed about its periphery and having the under side of said flange inclined, a collar slidable upon the shaft but keyed thereon, arms carried thereby having their ends bent at an inclination to engage the inclined under side of the flange, and means for effecting the movement of said collar, substantially as set forth.

JAMES A. WRIGHT.

Witnesses:
JAS. J. RYDER,
JOHN O. WRIGHT.